United States Patent [19]
Beigel

[11] Patent Number: 5,257,011
[45] Date of Patent: Oct. 26, 1993

[54] DATA ALTERING MEANS FOR MULTI-MEMORY ELECTRONIC IDENTIFICATION TAG

[75] Inventor: Michael L. Beigel, Corona, Calif.

[73] Assignee: Avid Corporation, Norco, Calif.

[21] Appl. No.: 6,251

[22] Filed: Jan. 19, 1993

Related U.S. Application Data

[63] Continuation of Ser. No. 801,749, Dec. 3, 1991, Pat. No. 5,214,409.

[51] Int. Cl.$^5$ .............................................. H04Q 1/18
[52] U.S. Cl. ................................ 340/572; 340/825.54
[58] Field of Search ............................ 340/572, 825.54

[56] References Cited

U.S. PATENT DOCUMENTS

| | | | |
|---|---|---|---|
| 4,333,072 | 6/1982 | Beigel | 340/825.54 |
| 4,494,545 | 1/1985 | Slocum et al. | 128/419 P |
| 4,561,443 | 12/1985 | Hogrefe et al. | 128/419 PG |
| 4,656,463 | 4/1987 | Anders et al. | 340/541 |
| 4,724,427 | 2/1988 | Carroll | 342/44 |
| 4,730,188 | 3/1988 | Milheiser | 340/825 |
| 4,941,201 | 7/1990 | Davis | 455/41 |
| 5,103,222 | 4/1992 | Hogen Esch et al. | 340/572 |
| 5,105,190 | 4/1992 | Kip et al. | 340/572 |
| 5,113,349 | 5/1992 | Nakamura et al. | 340/825.54 |
| 5,164,732 | 11/1992 | Brockelsby et al. | 340/825.54 |
| 5,216,419 | 6/1993 | Fujisaka et al. | 340/825.54 |
| 5,218,343 | 6/1993 | Stobbe et al. | 340/572 |

Primary Examiner—Glen R. Swan, III
Attorney, Agent, or Firm—Robert E. Malm

[57] ABSTRACT

Multi-memory electronic identification tags are utilized in short-range cooperative electronic identification systems for the identification of a variety of objects. Such systems are comprised of readers and tags wherein a reader in the proximity of a tag may communicate with the tag in accordance with a specified process if the tag belongs to a certain class of tags. Tags are intended to be implanted within living tissue or concealed beneath the surface of inanimate objects. Communication between tag and reader is accomplished by a reader establishing a reversing magnetic field in the vicinity of a tag and the tag varying its absorption of power from the field in accordance with the information to be transmitted. The multi-memory tag utilizes three types of memory for the storage of data to be transmitted to an interrogating reader. The first type of memory is both permanent and unalterable and is used for storing data that is unique to the tag and never needs to be changed. The second type of memory is permanent but also alterable and is used for storing data that characterizes the object to which the tag is attached. The data stored in this second type of memory is altered by means of a separate memory programming unit which communicates with a tag by means of a reversing magnetic field that is modulated in accordance with the new data. The third type of memory is for the temporary storage of data produced by tag sensors.

5 Claims, 4 Drawing Sheets

5,257,011

DATA ALTERING MEANS FOR MULTI-MEMORY ELECTRONIC IDENTIFICATION TAG

This is a continuation of application Ser. No. 07/801,749, filed Dec. 3, 1991, now U.S. Pat. No. 5,214,409.

BACKGROUND OF INVENTION

This invention relates to cooperative identification systems in which the identifying agency and the object to be identified cooperate in the identification process according to a prearranged scheme. More specifically, the invention relates to systems consisting generically of an interrogator-responsor (or "reader") inductively coupled to a transponder (or "tag") where the reader is associated with the identifying agency and the tag is associated with the object to be identified.

Such systems are being used or have the potential of being used for identifying fish, birds, animals, or inanimate objects such as credit cards. Some of the more interesting applications involve objects of small size which means that the transponder must be minute. In many cases it is desirable to permanently attach the tag to the object which means implantation of the device in the tissues of living things and somewhere beneath the surfaces of inanimate objects.

In most cases, implantation of the tag within the object forecloses the use of conventional power sources for powering the tag. Sunlight will usually not penetrate the surface of the object. Chemical sources such as batteries wear out and cannot easily be replaced. Radioactive sources might present unacceptable risks to the object subject to identification.

One approach to powering the tag that has been successfully practiced for many years is to supply the tag with power from the reader by means of an alternating magnetic field generated by the reader. This approach results in a small, highly-reliable tag of indefinite life and is currently the approach of choice.

Tags typically use programmable read-only memories (PROMs) for the storage of identification data to be communicated to readers. The PROMs are programmed either by the manufacturer of the tags at the time of manufacture or by the user prior to implantation in the objects to be identified. Once the PROMs are programmed and the tags are implanted, the PROMs usually cannot be reprogrammed. Thus, tampering with the information stored in a tag is essentially impossible.

There are situations, however, where the user would like to reprogram the tag PROMs in situ because the identification scheme has become known to unauthorized individuals or organizations or certain data associated with the object to be identified needs to be revised or updated. The utilization of reprogrammable PROMs in tags would permit the user to exercise a reprogramming option when the need arose: for example, to store and/or update information which is specific to the object or animal to be identified such as sex, weight, or medical treatment information.

The exclusive utilization of reprogrammable PROMs would, however, prevent the manufacturer from offering after-sale diagnostic and/or warranty services since the tags would no longer have unique and permanent identifying codes.

Thus, the need exists for tags which carry two kinds of information: (1) a manufacturer's serial number and perhaps other data which is permanently associated with a tag and cannot be altered and (2) object-identifying nonvolatile data that is alterable by the user.

BRIEF SUMMARY OF INVENTION

The multi-memory electronic identification tag comprises a means for receiving data, a means for transmitting data, and up to three types of memory where the data to be transmitted is stored.

A portion of the data to be transmitted is stored permanently in a non-reprogrammable type of memory wherein the stored data cannot be altered. Examples of this type of memory are the fusible-link diode-array read-only memory, the anti-fuse memory, and the laser-programmable read-only memory.

Another portion of the data to be transmitted is stored permanently in a reprogrammable type of memory wherein the stored data can be altered even after the tag has been implanted in the object that is subject to identification. Examples of this type of memory are the electrically-erasable-programmable read-only memories (EEPROMs). The multi-memory tag further comprises the means for receiving data from a remote reprogramming unit and the means for programming such reprogrammable memory with the newly-received data.

A third portion of the data to be transmitted is stored temporarily in a type of memory which can be written to and read from with alacrity and which typically utilizes an array of capacitors as the storage media. The type of data appropriately stored in this type of memory is data that has their origins in sensors contained in or attached externally to the tag.

An object of the invention is to provide a permanent and unalterable means for storing data that uniquely identifies a tag and can thereby be used by the tag manufacturer in providing diagnostic and warranty services.

Another object of the invention is to provide permanent but alterable means for storing data that a user may wish to associate with the object being tagged. The user may require that this data, particularly the association of the data with the tagged object, be kept private. In case of compromise, the user may utilize the reprogrammable memory option to recode the data assigned to particular objects.

Still another object of the invention is to provide a temporary storage facility in which the outputs of sensors embedded in or associated with the tag may be stored until they are transmitted to the user.

It is also an object of the invention to provide a means for transmitting from the user to a tag the data that is to be substituted for the data stored in reprogrammable memory.

DESCRIPTION OF THE PREFERRED EMBODIMENT

The electronic identification system that utilizes multi-memory tags is comprised of a reader that is capable of interrogating and receiving information from a multi-memory tag, a programming unit that is capable of reprogramming the reprogrammable portion of the memory of the multi-memory tag, and a multi-memory tag that is capable of transmitting data to the reader and receiving data and commands from the programming unit.

Figure 1:
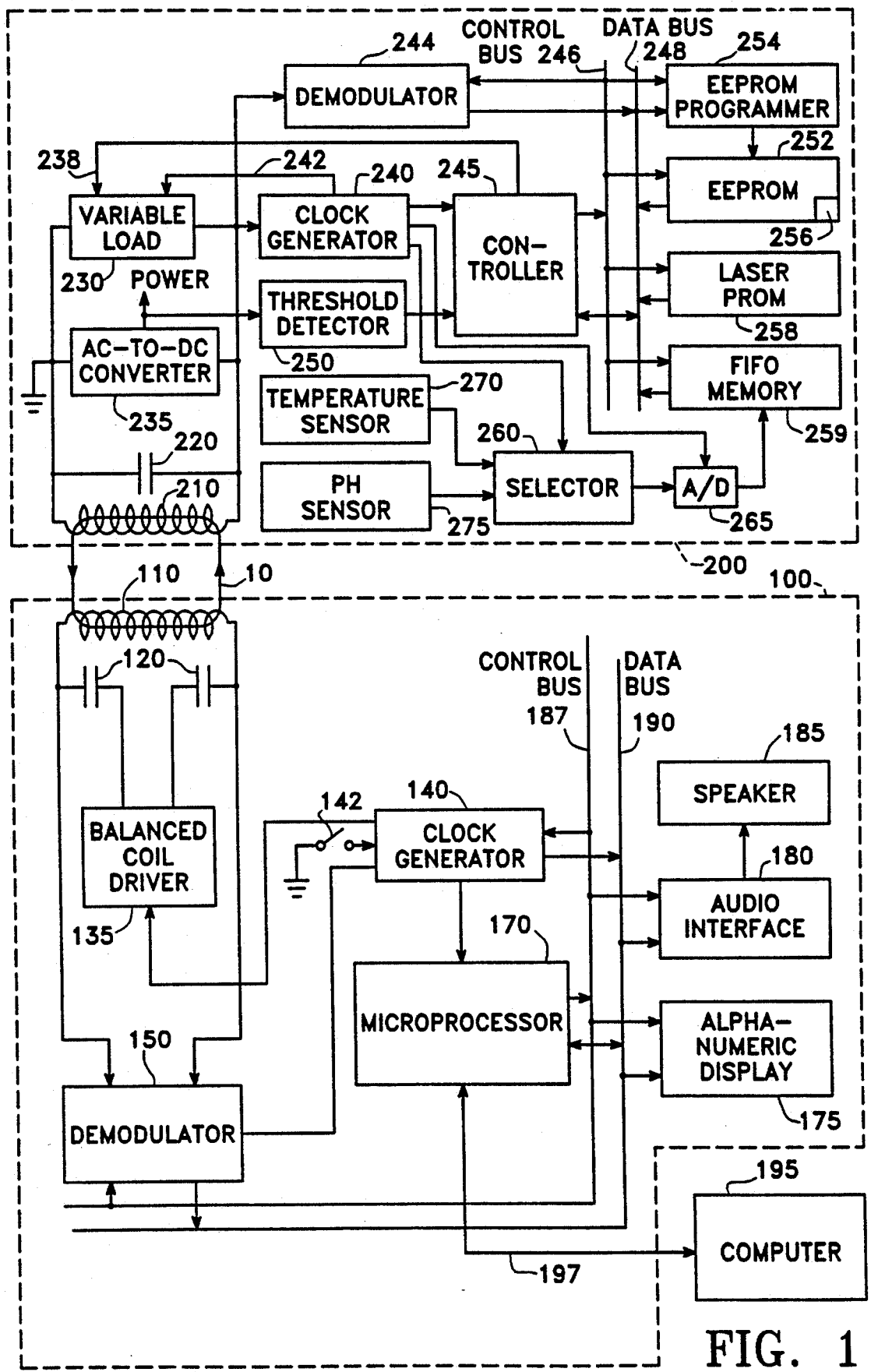
FIG. 1 is the functional block diagram of the preferred embodiment of an electronic identification system that comprises a conventional reader and the multi-memory tag.

The functional block diagrams of the preferred embodiments of the reader and the multi-memory tag are shown in FIG. 1. The reader 100 interrogates the tag 200 by generating a reversing magnetic field 10 by means of the wound wire coil 110 that is inductively coupled to a similar coil 220 in the tag 200. The coil 110 in series with capacitor pair 120 is driven by the double-ended balanced coil driver 135 with a periodic signal of appropriate frequency supplied by the clock generator 140. Typically, the driving frequency is in the range from 100 kHz to 400 kHz.

A typical design for balanced drivers suitable for driving the coil 110 and capacitors 120 is the commercially-available integrated circuit SI9950DY which comprises a complementary pair of power metal oxide silicon field effect transistors (power MOSFETS), the output ports of the two transistors being connected to opposite ends of the coil 110 through the two capacitors 120. The two transistors are driven by complementary waveforms, the second waveform being an inverted version of the first.

The two capacitors 120 have equal capacitances, the capacitance being chosen so that the combination of the coil and capacitor pair constitutes a series resonant circuit at a desired driving frequency.

The clock generator 140 is comprised of a crystal-controlled oscillator and divider chains of conventional design. The oscillator frequency is chosen such that all required driving frequencies can be obtained by integer divisions.

The clock generator 140 includes a duty cycle timer which generates a square-wave timing signal that causes the reader coil 110 to be energized when the signal is high. The signal remains high for a time long enough to receive the information to be communicated by a tag on the particular driving frequency being used. The signal remains low for a time long enough for the reader 100 to be moved to a new reading position.

The purpose of operating the reader coil 110 with a duty cycle is to conserve battery power and achieve longer operating periods between battery rechargings or replacements.

The duty cycle timer is set to low by the microprocessor 170 whenever the microprocessor recognizes a condition that indicates failure of the read process.

The duty cycle timer turns on only when the reader power switch is on and the user-activated "read" trigger switch 142 is closed. Releasing the "read" trigger does not disable the duty cycle timer until the normal transition from high to low occurs.

Time T is maintained in the clock generator 140 by a counter that counts cycles of the driving frequency when the duty cycle timer signal is high. The counter is reset each time the duty cycle timer signal goes from high to low. The T counter can be accessed by the microprocessor 170 by means of the control bus 187 and data bus 190.

The T counter supplies an interrupt signal to the microprocessor 170 when T equals $T_1$ where $T_1$ is the time required for the reader coil voltage to approach within say 0.1% of its steady-state voltage. When the $T_1$ interrupt occurs, signal processing in the reader begins.

In response to an interrogation by the reader 100, the tag 200 causes the variable load 230 that is inductively coupled to the reader coil 110 by means of coil 210 to vary in accordance with one or the other of two patterns, one pattern being associated with the transmission of a 0 and the other being associated with the transmission of a 1. The loading pattern is manifested at the reader by a variation in the voltage across the reader coil 110. The demodulator 150 performs those operations necessary to determine whether the voltage pattern during a bit period corresponds to a 0 or a 1 and periodically communicates this determination to the microprocessor 170 by means of the data bus 190.

The tag data that derives from this information together with operational information is caused by the microprocessor 170 to be visually displayed on alpha-numeric display 175. This same information is made available audibly to the user in the form of audio signals and/or artificial speech by means of the audio interface 180 and the speaker 185.

The microprocessor 170 exercises control over the clock generator 140, the demodulator 150, the alpha-numeric display 175, and the audio interface 180 by means of the control bus 187. Data is exchanged between the microprocessor 170 and the clock generator 140, the demodulator 150, the alpha-numeric display 175, and the audio interface 180 by means of the data bus 190.

An external digital computer 195 can exercise control over and exchange data with the microprocessor 170 by means of the standard RS-232 data link 197.

The circuits and devices which provide the basis for the reader design are conventional and are fully described in a number of textbooks having to do with the design of communication systems and equipment. Specific examples of reader designs are contained in U.S. Pat. No. 4,333,072 to Beigel and U.S. Pat. No. 4,730,188 to Milheiser which are hereby incorporated by reference.

The tag 200, when in the proximity of and inductively-coupled to the reader 100, extracts power from the alternating magnetic field 10 established by the reader coil 110 by means of the multi-turn coiled conductor 210 in parallel with the capacitor 220, the combination constituting a resonant circuit at one of the reader's driving frequencies.

The variable load 230 is connected across the coil-capacitor combination thereby providing a means for varying the load on the balanced coil driver 135 in the reader 100 resulting from the inductive coupling of the reader and tag coils. The variable load 230 is resistive in the preferred embodiment thereby achieving the greatest possible effectiveness in absorbing power from the reversing magnetic field and in communicating with the reader. Other less desirable embodiment could use loads that are inductive, capacitive, or some combination of inductive, capacitive, and resistive.

The communication capability of the reader 100 and the tag 200 are critically dependent on the characteristics of the reader coil 110 and the tag coil 210. The number of turns for the reader coil should be as large as possible so that the magnetic field created by the reader coil is a large as possible. On the other hand, the resistance of the reader coil 110 (proportional to the number of turns) must not become so large as to be a substantial mismatch to the driving impedance and thereby impede the transfer of power to the tag. The preferred embodiment of the reader coil is wound on an oval plastic core approximately 4≡ inches long by 3⅛ inches wide. The coil is wound with 90 to 100 turns of 28-gauge wire yielding a coil with approximate inductance of 2.3 mH and approximate resistance of 7.6 ohms.

The number of turns on the tag coil 210 also should be as large as possible in order to maximize the inductively-generated voltage across the coil. Again caution must be exercised in choosing the number of turns so that the power transfer between reader and tag is not adversely affected.

The alternating voltage appearing across the coil 210 as a result of being inductively coupled to the reader coil 110 is converted to direct current by means of the AC/DC converter and voltage regulator 235 which supplies all of the power required by the tag circuitry.

The alternating voltage appearing across the coil 210 provides a reference frequency for the clock generator 240 which supplies all of the clocking signals required by the tag circuitry. Another embodiment utilizes the alternating coil voltage to stabilize a voltage-controlled oscillator which would then act as the source for all clocking signals.

The controller 245 controls all of the operations performed by the tag circuitry by means of control bus 246 and data bus 248. A clock signal for the controller 245 is supplied by the clock generator 240.

The threshold detector 250 produces a signal when the voltage from the AC/DC converter and voltage regulator 235 reaches the level required for reliable operation of the tag circuitry. The threshold detector 250 is a simple comparison circuit that uses a Zener diode as a reference voltage.

The signal from the threshold detector 250 serves to reset the controller 245 which waits for a first predetermined period of time (measured by a clock cycle counter in the controller) for the purpose of allowing the voltage transient associated with the inductive coupling of an externally-generated magnetic field to the tag coil 210 to die down to the point where either power absorption by the tag can be detected by the reader or amplitude modulation by the programming unit can be detected by the tag.

After waiting for the transient to die down, the controller 245 waits for a second predetermined period of time (also measured by a clock cycle counter in the controller) for the purpose of allowing the demodulator 242 time enough to discover whether the interrogation is by the programming unit rather than the reader.

The demodulator 242 is enabled by the controller 245 at the expiration of the first predetermined time period. The demodulator 242 first extracts the modulating signal (if such exists) in the same manner as the reader demodulator 150 by taking the difference between two smoothed versions of the rectified coil signal, one of the smoothed versions being obtained by smoothing the rectified coil signal over a time period that is long compared to the period of the coil signal and short compared to the period of the bits that are transmitted by the programming unit, the other of the smoothed versions being obtained by smoothing the rectified coil signal over a time period that is long compared to the bit period.

Typically, the coil signal has a frequency of a few hundred kHz and the bit rate is a few kHz. These numbers suggest a smoothing time somewhere in the range of 10 to 20 coil signal periods for the first smoothed version. The second smoothed version should be smoothed for at least 10 bit periods.

The programming unit initially transmits an alternating series of "0's" and "1's" for the purpose of allowing the demodulator 242 to recognize the presence of a modulating signal. The demodulator recognizes the modulating signal presence by smoothing the rectified difference signal for at least ten bit periods and comparing the smoothed rectified difference signal with a predetermined threshold voltage which is three to five times the standard deviation of the noise appearing across the coil 210 and the capacitor 220. If the smoothed rectified difference signal is greater than the threshold voltage, the demodulator concludes that a modulating signal is present and sets the "modulation present" flag which can be read by the controller 245.

The threshold voltage is preferably established at such a level that the probability of falsely recognizing the presence of a modulating signal is less than 0.01 and the probability of recognizing the presence of a modulating signal that is truly present is greater than 0.99.

The demodulation process continues with the demodulator 242 identifying the peaks and valleys of the difference signal and thereby generating a bit rate clock signal which is a square wave having a frequency equal to the bit rate and having low-to-high transitions that coincide with the peaks and valleys of the difference signal. The demodulator identifies a bit by observing the sign of the difference signal when a positive transition of the bit rate clock signal occurs. If the difference signal is negative, the received bit is a "0". If the difference signal is positive, the received bit is a "1".

The demodulator 242 can be implemented in a number of ways. An example of a suitable implementation is given in the aforereferenced Beigel patent in connection with the description of the preferred embodiment of the reader amplitude demodulator.

The bit rate clock signal alerts the controller 245 each time a bit decision is made whereupon the controller retrieves the bit and saves it in memory. The programming unit transmits a "start message" code following the alternating series of "0's" and "1's". If a "start" message code is not received by the end of the second predetermined time period, the controller 245 concludes that the interrogation is by a reader rather than a programming unit and proceeds to transmit the data stored in memory to the reader.

A message is transmitted by the controller 245 by applying a square wave signal of appropriate frequency to the variable load 230 for each bit of the message.

The controller 245 retrieves for transmission all but the sensor data portion of the message from the nonvolatile memories 252 and 258.

The electrically-erasable programmable read-only memory (EEPROM) 252 contains data that the user of the tag may wish to change sometime in the future. The user changes the data by transmitting an appropriate message via the programming unit to the tag whereupon the controller 245 causes the EEPROM programmer 254 to reprogram the EEPROM 252 with data included in the message. The EEPROM 252 can also be reprogrammed by using standard reprogramming circuitry that connects directly to contacts on the device, when such contacts are accessible.

The reprogramming of the EEPROM can be permanently inhibited during initial programming, prior to implantation in or attachment to the object to be identified, by breaking a fused connection (i.e. "blowing" a fuse) in the EEPROM by the application of a voltage of sufficient magnitude to the input port 256 of the EEPROM.

The laser-programmable read-only memory (laser PROM) 258 contains data which uniquely identifies the tag and is unalterable because of the nature of the laser PROM. The manufacturer utilizes this data in providing warranty and diagnostic services to the user. The laser PROM is permanently programmed at the time of manufacture by utilizing a laser beam to make or break connections in the device.

In the embodiment shown in FIG. 1 the controller 245 obtains the sensor data from a first-in/first-out (FIFO) memory device 259 where the data was stored as a result of the sensor selector 260 connecting the A/D converter 265 sequentially first to temperature sensor 270 and then to PH sensor 275.

In the absence of a message transmission from the controller 245, the variable load 230 is dormant and does not appreciably load the resonant circuit 210, 220. When the controller transmits a message over line 238 to the variable load 230, the variable load applies a load to the resonant circuit 210, 220 in accordance with a frequency-shift-keying (FSK) technique. A message bit "1" causes a "mark" frequency signal to be selected. A "0" selects a "space" frequency signal. The selection of the "mark" frequency signal causes the load to be turned on or off depending on whether the "mark" frequency signal is high or low. Similarly, the "space" frequency signal causes the load to be turned on or off depending on the high and low states of the "space" frequency signal. The "mark" and "space" frequency square-wave signals are derived from the reader driving frequency and supplied by the clock generator 240 to the variable load 230 over lines 242.

Since the "mark" and "space" frequencies are phase-coherent with the magnetic field driving frequency, the reader may advantageously extract the information from the power absorption signal by means of a coherent demodulation technique thereby realizing the increased communication efficiency of coherent frequency-shift keying (CFSK) as compared to non-coherent frequency shift keying (NCFSK).

The "mark" and "space" frequencies are chosen small enough that the sidebands resulting from the amplitude modulation of the driving-frequency signal are not attenuated by more than say 3 dB with respect to the driving frequency by the reader resonant circuit 110, 120/125. The spacing of the "mark" and "space" frequencies should ideally be an integer times the bit rate where the integer is preferably equal to or greater than two. For a driving frequency of 400 kHz and a bit rate of 5 kHz, typical values for the "mark" and "space" frequencies are 50 kHz and 40 kHz respectively. Note that the difference 10 kHz is equal to the integer 2 times the bit rate.

It will be obvious to one skilled in the art that other modulation techniques could be used in both the tag 200 and the reader 100. For example, the tag could utilize on-off-keying (OOK) whereby the variable load 230 turns the load off when a "0" is transmitted and turns the load on and off when a "1" is transmitted (or vice versa) in accordance with whether a square wave of predetermined frequency supplied by the clock 240 is high or low.

Phase-shift-keying (PSK) in either the fully-coherent (CPSK) or differentially-coherent (DCPSK) versions could also be used. Coherent phase-shift-keying would result if the variable load 230 turned the load on or off in accordance with whether the square wave described above was high or low respectively when a "0" was transmitted and turned the load on or off when the square wave was low or high respectively when a "1" was transmitted (or vice versa).

Differentially-coherent phase-shift-keying would result if the variable load 230 turned the load on and off in the same way as it was during the previous bit period when a "0" is transmitted and in the opposite way when a "1" is transmitted.

Figure 2:
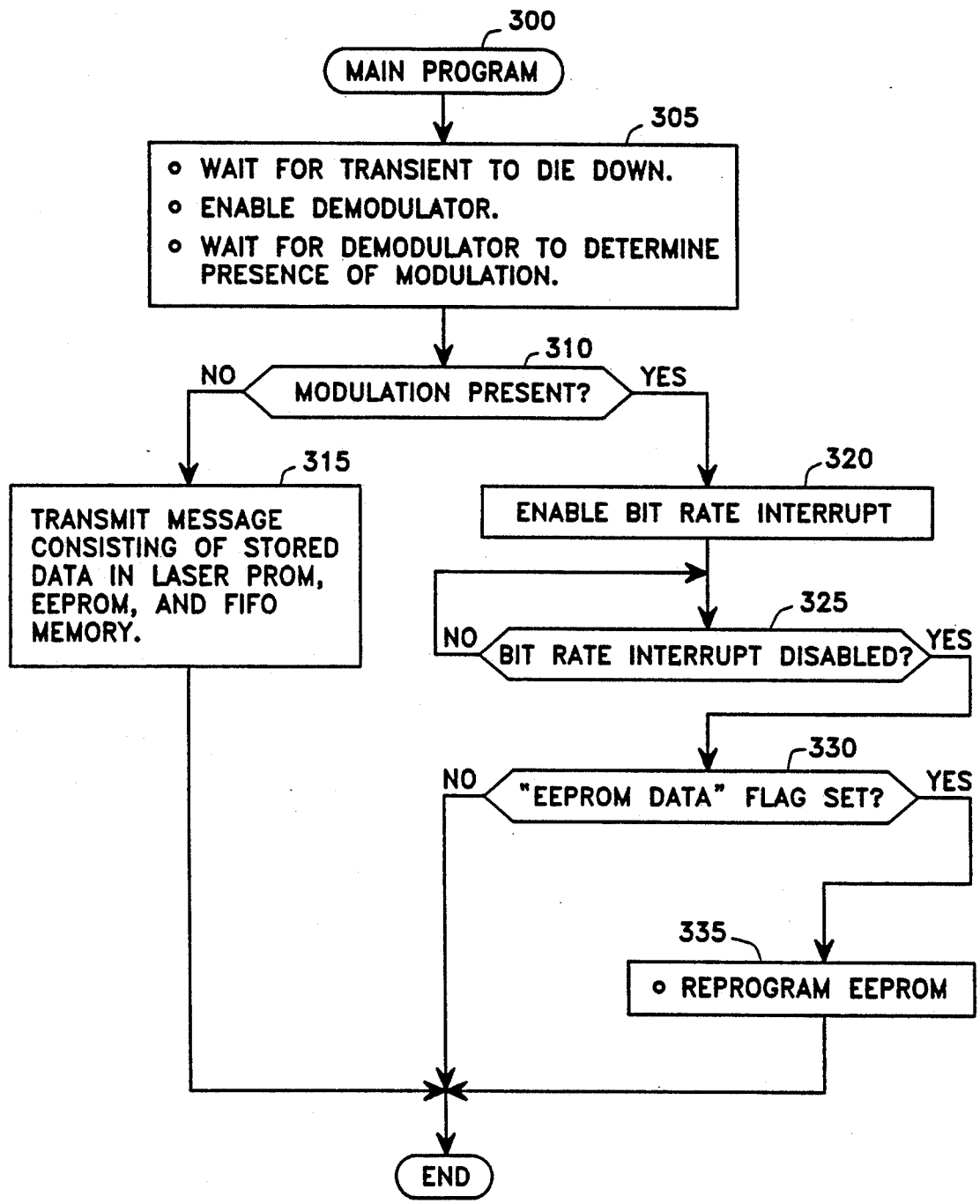
FIG. 2 is the flow diagram associated with the main program that governs the operations of the controller in the multi-memory electronic identification tag.

The operations performed by the controller 245 in the tag 200 are detailed in the flow diagram shown in FIG. 2. The reset of the controller 245 (FIG. 1) by the threshold detector 250 (FIG. 1) causes the controller registers to be cleared and directs the controller to perform the sequence of operations beginning at the main program address 300.

The controller first performs operations 305. It waits for a predetermined time long enough for the voltage transient that results from the coupling of a magnetic field to the coil 210 (FIG. 1) to die down to a level low enough to permit the demodulation of coil signals by either the reader 100 or the tag 200 (FIG. 1). It then enables the demodulator 242 (FIG. 1) and waits for a predetermined time that is long enough for the demodulator to determine whether the coil signal is modulated.

The controller reads the "modulation present" flag in the demodulator to determine whether the coil signal is modulated 310. If modulation is not present, the controller transmits 315 a message consisting of the data stored in the laser PROM, the EEPROM, and the FIFO memory.

If modulation is present, the controller enables 320 the bit rate interrupt, the bit rate signal being supplied by the demodulator. The controller then waits 325 for the bit rate interrupt to be disabled in the bit rate interrupt routine.

When the controller determines 325 that the bit rate interrupt has been disabled, it performs test 330. If the "EEPROM data" flag was set, the controller reprograms the EEPROM in accordance with the data received from the programming unit. If the "EEPROM data" flag was not set 330, the controller closes down until the next interrogation.

Figure 3:
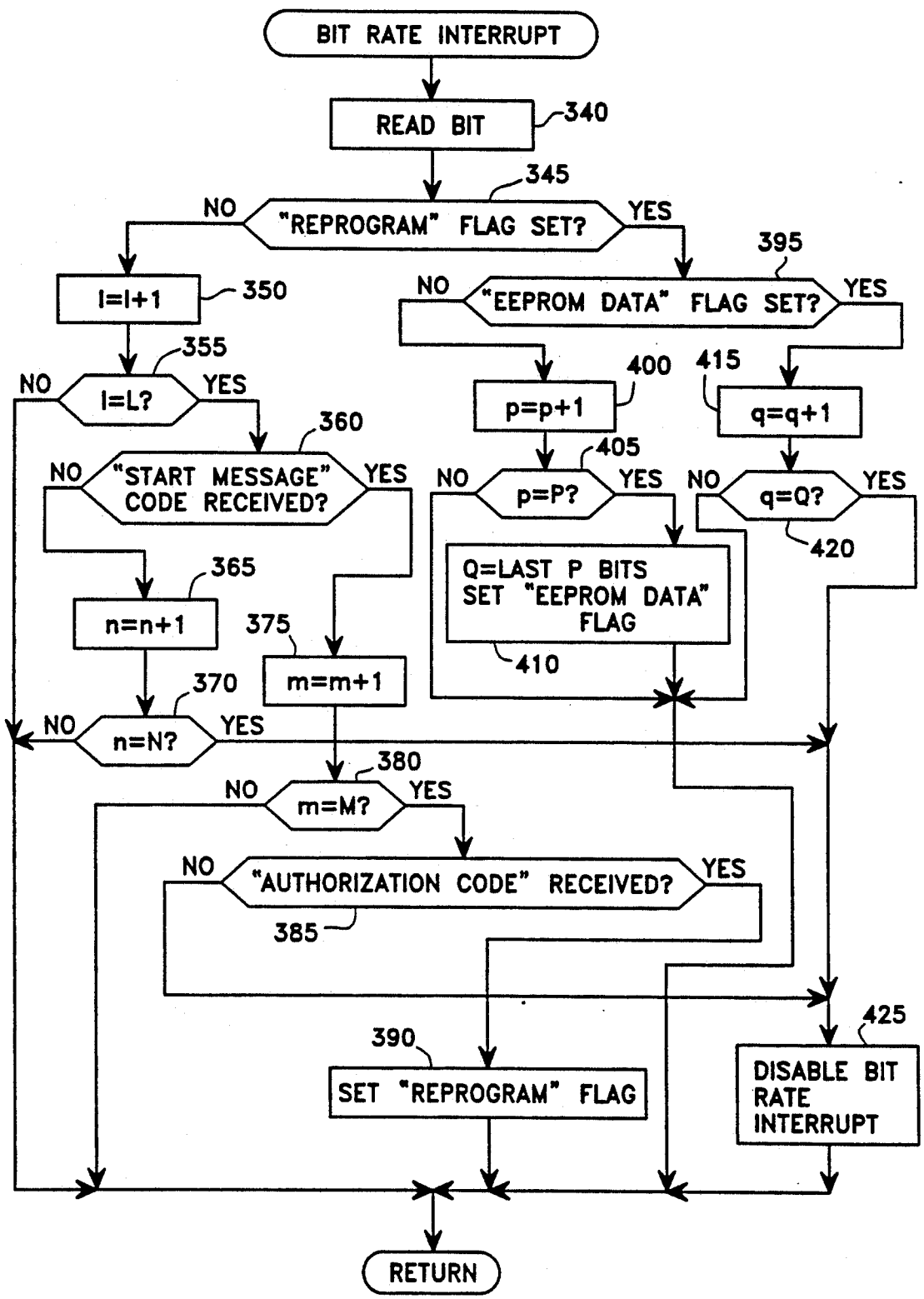
FIG. 3 is the flow diagram associated with the routine performed by the controller in the multi-memory electronic identification tag when the bit rate interrupt occurs.

When the bit rate interrupt is enabled, a positive transition of the bit rate clock signal supplied by the demodulator 242 (FIG. 1) causes the main program shown in FIG. 2 to be interrupted and the controller is directed to the address in memory of the bit rate interrupt routine shown in FIG. 3. The registers identified in this routine were cleared and the flags reset when the controller 245 was reset by the threshold device 250 when an interrogation first occurred (see discussion in connection with FIG. 1).

The controller begins the routine by reading 340 the bit just demodulated by the demodulator. The controller then determines whether the "reprogram" flag is set 345.

If the "reprogram" flag is not set, the 1 register is incremented 350 and a determination is made 355 as to whether L bits have been received, L being the number of bits in the "start message" code. If L bits have not been received, the controller returns to the main program. If L bits have been received, the controller determines 360 whether the last L bits received correspond to the "start message" code. If they do not, the n register is incremented 365 and a determination is made 370 as to whether there have been N failures to detect a "start message" code. The integer N exceeds the largest possible value of n that can occur prior to the receipt of a "start message" code.

If there have not been N failures, the controller returns to the main program to wait for the next bit to be demodulated. If there have been N failures, the conclusion is drawn that either the received signal is not modulated or the correct "start message" code is not being used by the programming unit, the bit rate interrupt is disabled 425, and the controller returns to the main program. As discussed above in connection with FIG. 2, the controller closes down until it is activated again by a new interrogation.

If a "start message" code is received 360, the m register is incremented 375 and the determination is made 380 as to whether M bits have been received after the start of the message, M being the number of bits in the "authorization to reprogram the EEPROM" code. If authorization is not received, the bit rate interrupt is disabled 425 and the controller returns to the main program where it is caused to close down until it is activated again by a new interrogation. If authorization is received, the "reprogram" flag is set 390 and the controller returns to the main program to wait for the next demodulated bit.

If the "reprogram" flag is set 345, the controller examines 395 the state of the "EEPROM DATA" flag. If the flag is not set, the p register is incremented 400 and tested 405 to see if the new value equals P, the maximum number of bits permitted in the message constituting the EEPROM reprogramming data. If P message bits have not yet been acquired, the controller returns to the main program and waits for the next demodulated bit. If P message bits have been acquired, these P bits are stored in the Q register and the "EEPROM data" flag is set 410. The controller then returns to the main program and waits for the next demodulated bit.

If the "EEPROM data" flag is set 395, the q register is incremented 415 and tested 420 to see if the new value is equal to Q. If Q EEPROM data bits have not yet been received, the controller returns to the main program and waits for the next demodulated bit. If Q bits have been received, the entire message has been received. The bit rate interrupt is disabled 425 and the controller returns to the main program and reprograms the EEPROM with the new data.

Figure 4:
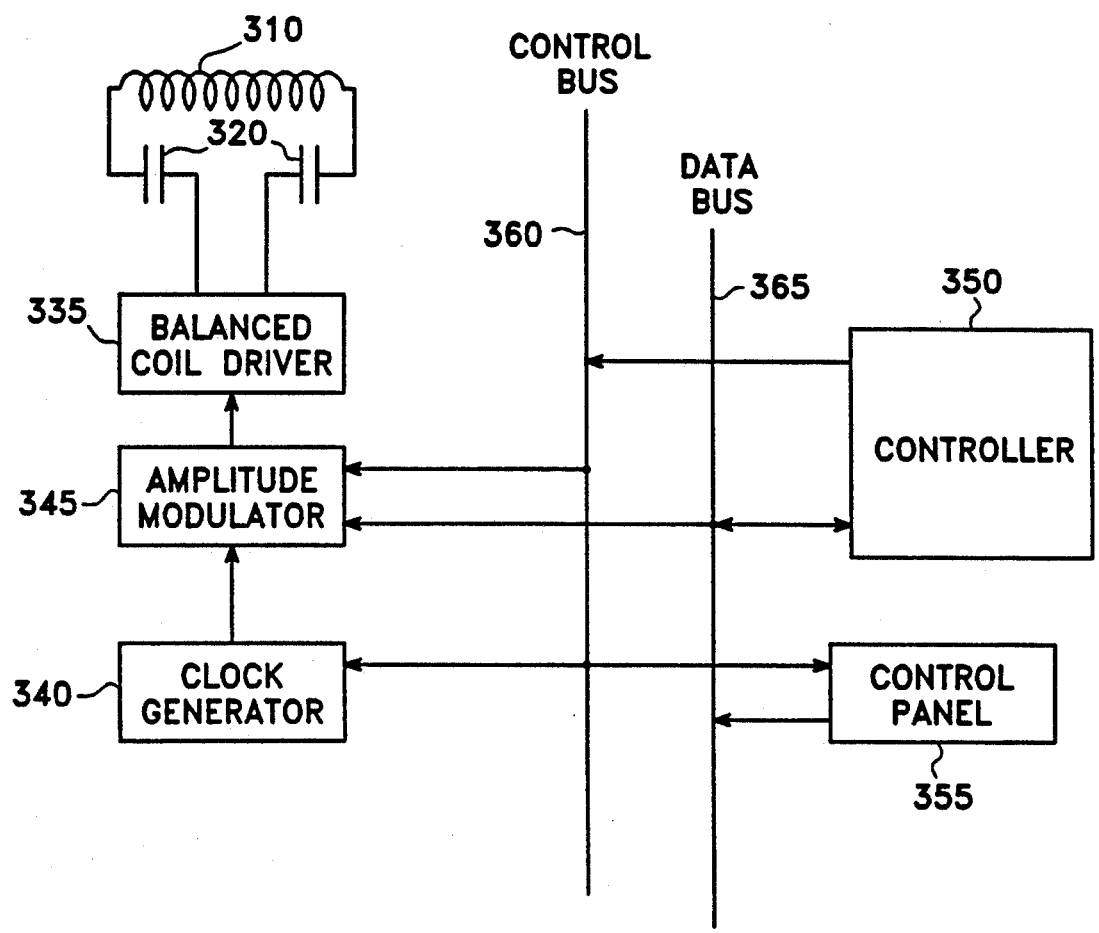
FIG. 4 is the functional block diagram of the preferred embodiment of the programming unit that is used to program the multi-memory electronic identification tag.

The functional block diagram of the programming unit is shown in FIG. 4. The programming unit communicates data to a tag by coupling the coil 310 with the tag coil 210 (FIG. 1) by means of a modulated reversing magnetic field generated by the coil 310. The coil 310, the capacitors 320, and the balanced coil driver 335 are identical to the coil 110, the capacitors 120, and the balanced coil driver 135 in the reader 100 (FIG. 1).

The balanced coil driver 335 is driven by a sinusoidal or square-wave carrier supplied by the clock generator 340 and modulated in amplitude by the amplitude modulator 345 in accordance with data supplied by the controller 350. The frequency of the carrier is the frequency at which the series combination of the coil 310 and the capacitors 320 are resonant. A control panel 355 provides the means for a user to enter tag memory reprogramming data into the controller 350 for transmission to a tag and to initiate a reprogramming transmission by the programming unit.

The controller 350 communicates with the amplitude modulator, the clock generator, and the control panel by means of a control bus 360 and a data bus 365.

Although the preferred embodiment utilizes amplitude modulation as the means for communicating information, it will be apparent to one skilled in the art that the concepts and objectives of the invention could also be realized with other forms of modulation such as phase shift keying and frequency shift keying.

The user initiates a reprogramming operation by selecting the "data enter" position of the "data enter"/"transmit" switch and operating the "power on" switch on the control panel 355 which causes the controller 350 to initialize its registers and to enter into its program counter the memory address corresponding to the "data enter" routine.

The controller 350 by means of the control bus 360 connects the control panel hexadecimal keyboard to the data bus 365. The user enters, one hexadecimal digit at a time, a message consisting of an M-bit authorization code, a P-bit number indicating the number of bits of data to be programmed into the EEPROM, and the data to be programmed.

The controller 350 transforms the hexadecimal data entered by the user into a binary message and adds an alternating series of "0's" and "1's" followed by the "start message" code as a preamble.

When the user is ready to transmit the reprogramming message to the tag, he selects the "transmit" position for the "data enter"/"transmit" switch, places the programming unit in proximity of the tag to be reprogrammed, and pulls the "transmit" trigger.

The controller 350 then commands the clock generator 340 to send the sinusoidal carrier to the amplitude modulator 345 and causes the data input port of the amplitude modulator to be connected to the data bus 365. The controller 350 sends the message preamble and the reprogramming message, one bit at a time at the bit rate, to the amplitude modulator 345 which causes the sinusoidal or square-wave carrier to enter the balanced coil driver 335 at one or the other of two amplitudes, the particular amplitude at any one time being determined by whether a "0" or a "1" is being transmitted.

When the complete message has been transmitted, the controller 350 instructs the clock generator 340 to stop sending the sinusoidal carrier to the amplitude modulator 345.

The user can verify that the EEPROM has been reprogrammed by interrogating the tag with a reader.

In an alternative embodiment the functions of the programming unit (FIG. 4) could be incorporated in the reader 100 (FIG. 1).

When an interrogation occurs, the preferred embodiment of the tag first determines whether the source of the interrogation is the programming unit by determining whether the signal being received is modulated. If there is no modulation, the tag concludes that the source of the interrogation is a reader and promptly transmits the data stored in memory.

In those situations where the fastest possible response to a reader is desired, an alternative embodiment of the tag is preferred whereby the tag transmits its data whenever it is interrogated thereby ensuring that the reader obtains a response in the shortest possible time. After transmitting its data, the tag would determine whether the programming unit was actually the source of the interrogation by determining whether the interrogating signal remained on and was modulated in which case the tag would extract the data carried by the signal and, if appropriate, reprogram the alterable memory.

What is claimed is:

1. An apparatus for altering data in the memory of an electronic identification tag, said apparatus having a data entry mode and a data transmission mode, said apparatus comprising:
   a data entry device that enables a user by physical interactions with said data entry device to enter data into said apparatus when said apparatus is in the data entry mode;
   a means for communicating data entered into said apparatus by said user to said tag when said apparatus is in the data transmission mode, the communication process being initiated by a start signal;
   a transmit control means that enables the user by physical interactions with said transmit control means to generate said start signal;
   a mode control means that places said apparatus in either the data entry mode or the data transmission mode as a result of the user's physical interactions with said apparatus.

2. The apparatus of claim 1 wherein said communicating means comprises:
   a means for generating a reversing magnetic field;
   a means for modulating said reversing magnetic field in accordance with said user-supplied data.

3. The apparatus of claim 2 wherein said magnetic field generating means comprises a coil, a first capacitor connected to one end of said coil, and a second capacitor connected to the other end of said coil, said coil and capacitors having an alternating voltage impressed across the series combination, the frequency of said alternating voltage being the resonant frequency of said series combination.

4. The apparatus of claim 1 further comprising an electronic identification tag having a memory wherein the data stored in said memory is alterable, the alterability of the stored data being subject to permanent disablement.

5. The apparatus of claim 4 wherein the electronic identification tag comprises:
   a means for altering said alterable data;
   a means for receiving data to be substituted for said alterable data by said altering means.

* * * * *